INVENTOR.
LOUIS B. COURTOT

United States Patent Office 2,898,963
Patented Aug. 11, 1959

2,898,963

NUT LOCKING MECHANISM WITH THREADED PAWL MANIPULATING SLEEVE

Louis B. Courtot, Euclid, Ohio, assignor to The Weatherhead Company, Cleveland, Ohio, a corporation of Ohio Application September 17, 1953, Serial No. 380,715

1 Claim. (Cl. 151—10)

This invention relates to means for securing elements together and more particularly to a new and improved fluid coupling.

A fluid coupling incorporating this invention is generally used to connect two fluid conducting hoses or the like, in such a manner that the coupling may be disconnected without releasing any of the fluid under pressure which is contained in a hose. This application is particularly useful in connection with tractors and trailers wherein the brake lines of the trailer are attached to the tractor but must be arranged so that they may be disconnected without the loss of brake fluid and without admitting air into the lines. Many attempts have been directed to providing a coupling suitable for this and similar applications, however, difficulty has been encountered in that the coupling sometimes tends to be disconnected accidentally. It must be understood that even though the coupling should be immune to accidental disconnecting, that it also must be arranged so that it is a simple matter to disconnect the coupling when it is desired. The locking means, according to this invention, provides a satisfactory and economical solution to this problem and may be used in any application wherein two parts are threaded together and must be secured against accidental disconnecting caused by vibration and the like.

Prior art devices attempting to solve the problem of accidental disconnection have included spring projections on one member of the coupling, which engages a ratchet on the other member of the coupling and prevents rotation in the uncoupling direction. Sleeve means are usually provided to depress the spring projections away from the ratchet at the beginning of the uncoupling operation. In such devices, usually a right hand thread is used to connect the two members together and the sleeve means utilizes a left hand thread. Users of such devices are often confused due to this left hand and right hand thread arrangement because the initial uncoupling operation results in an initial motion of the sleeve which appears to be in the direction which would cause coupling in the initial operation, and the coupling of the two members results in an initial movement of the sleeve in a direction which would normally amount to an uncoupling operation.

It is an important object of this invention to provide a locking means which eliminates the possibility of accidental disconnection of a coupling or similar structure, which is simple to manufacture and easy to use.

It is another object of this invention to provide a new and improved coupling wherein the parts are locked against unintentional or accidental uncoupling movement, and wherein the parts may be disconnected easily when desired without the need of special tools.

It is still another object of this invention to provide a fluid coupling, which is arranged so that the fluid pressure augments the operation of the various elements in all positions.

The foregoing and other objects and advantages will become apparent in view of the following description taken in conjunction with the drawings, wherein.

A lock structure incorporating this invention comprises a first part formed with external threads and a second formed with internal threads to receive said external threads. The parts are arranged so that relative rotational movement of the parts in one direction with the threads engaged axially moves the parts together and relative rotational movements of the parts in the opposite directions moves the parts axially apart. A pawl is mounted on one of said parts axially slidable and rotatably fixed relative thereto, and pawl actuating means threaded to said one part are arranged to move said pawl toward the other of said parts when rotated in said one direction relative to said one part and move said pawl away from said other part when rotated in said opposite direction relative to said one part. Ratchet means are mounted on said other part rotatably fixed and axially slidable relative thereto and are arranged to engage the pawl and prevent relative rotational motion therebetween in said opposite direction when the pawl is in the position toward the other part, and spring means are provided to press ratchet means toward said one part.

Figure 1:
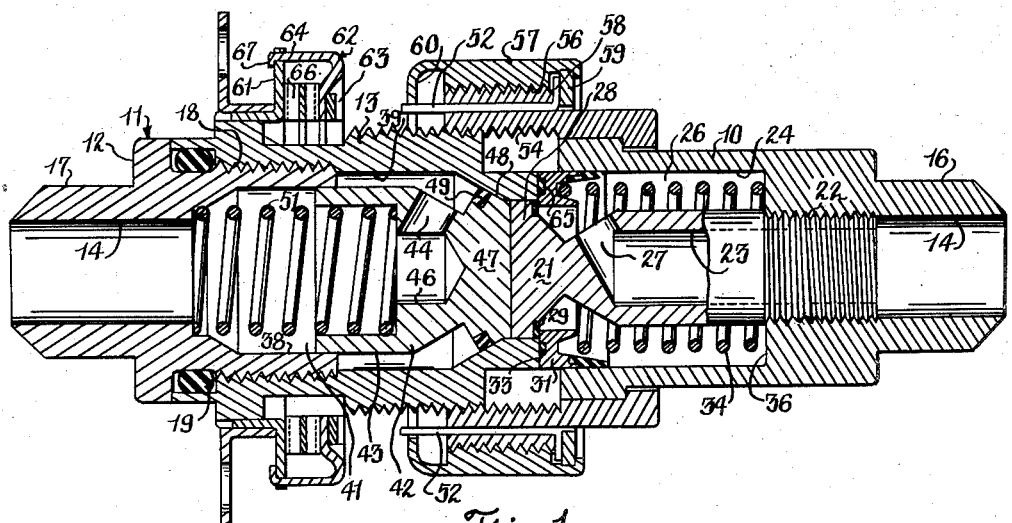
Fig. 1 is a cross-sectional view of a fluid coupling incorporating this invention showing the relationship between the elements prior to the coupling.

Referring to Fig. 1, a fluid coupling incorporating this invention is provided with a first part or body member 10 and a second part or body member assembly 11 comprised of two basic elements, the outer nipple member 12 and the threaded sleeve 13. The outer nipple 12 and the first body member 10 are both provided with axial bores 14 which provide fluid connection with a hose or the like which may be connected to each member. For purposes of simplification, the hoses have not been shown, but they would be connected by suitable means, such as the nipples 16 and 17. The outer nipple member 12 and the sleeve 13 are provided with threads 18 to securely connect these two elements together and a resilient seal 19 is used to insure a fluid seal therebetween.

Figure 2:
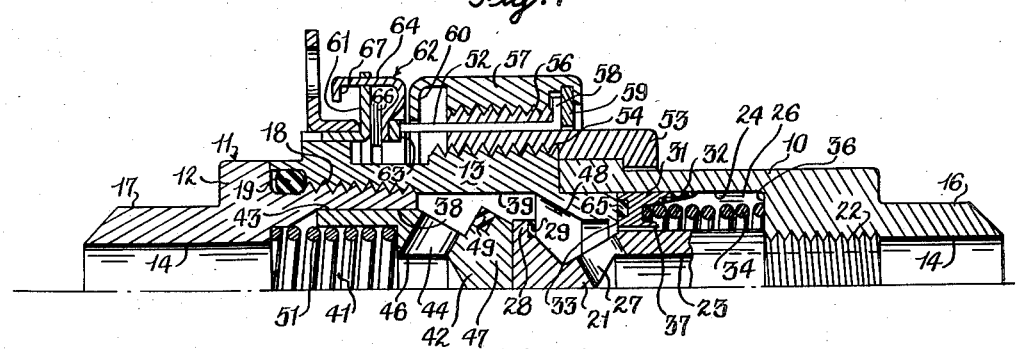
Fig. 2 is a cross-sectional view of a fluid coupling incorporating this invention, showing the relationship between the elements when the coupling is completely coupled.

The stationary poppet 21 is mounted in the first body member 10 by means of the threads 22 and is formed with an axial bore 23, which is in fluid communication with the bore 14 in the member 10. The first body member 10 is also provided with a relatively large counter bore 24, which is co-axial with the bore 14 and provides the chamber 26 surrounding the stationary poppet 21. A cross bore 27 is also formed in the stationary poppet 21 and provides fluid communication between the bore 23 and the outer surface of the stationary poppet at a point spaced from the forward end thereof. The forward end of the stationary poppet 21 is formed with an enlarged head section 28, which is provided with a rearwardly facing resilient seal 29. The sliding valve member 31 is positioned in the chamber 26 and is formed with an outer periphery having substantially the same diameter as the bore 24 and is arranged to slide axially along the surface thereof. This sliding valve member 31 is provided with a seal 32, which engages both the sliding valve member 31 and the surface of the bore 24 and provides a fluid seal therebetween. The sliding valve member 31 is also formed with a substantial radially forward wall 33 arranged to engage the seal 29 when the coupling is disconnected. A spring 34 in the chamber 26 extends between the shoulder 36 and the first body member 10 urges the sliding valve member toward the resilient seal 29. The inner diameter of the sliding valve member 31 is proportioned so that clearance 37 is provided between the periphery of the stationary poppet 21 and the sliding valve member as best seen in Fig. 2.

The outer nipple member 12 is formed with a large bore 38 which is in fluid communication with the bore 13 and the outer nipple member 12. The bore 38 in conjunction with the bore 39 in the threaded sleeve 13 form the chamber 41.

A sliding poppet 42 is positioned within the chamber 41 and is arranged with a circumferential portion 43 adapted to slide in the enlarged bore 38. The sliding poppet 42 is formed with fluid passages 44 and 46 which provide fluid communication from the rearward side of the sliding poppet to the outer periphery behind the head portion 47.

The forward end of the threaded sleeve 13 is formed with a valve seat 48 adapted to engage the resilient seal 49 mounted on the head portion 47 of the sliding poppet 42 when the sliding poppet is in the forward position in Fig. 1. A resilient spring 51 extends between the sliding poppet 42 and the outer nipple 12 and urges the sliding poppet toward the forward position shown in Fig. 1, wherein the poppet engages the valve seat.

In order to provide means for locking the coupling when it is assembled, a locking means is provided including a plurality of pawls 52 which are axially slidable in the nut 53 used to draw the first body member 10 and the second body assembly 11 together by means of the threads 54. The nut 53 is formed with threads on the outer periphery as at 56 and the pawl actuating member 57 is threaded thereon. The rearward end of each of the pawls 52 is formed with the radial extending arm 58 which is engaged by the retainer 59 mounted on the pawl actuating member 57. It is apparent that when the pawl actuating member 57 is rotated in the direction which advances it toward the second body assembly, that the pawls 52 are also advanced to the forward position as shown in Fig. 1. However, when the pawl actuating member 57 is rotated in the opposite direction, the pawls 52 are moved rearwardly by the engagement of the pawl actuating member 57 with the arms 58 until it assumes the position shown in Fig. 3 at which time the depending flange 60 prevents further motion.

Figure 3:
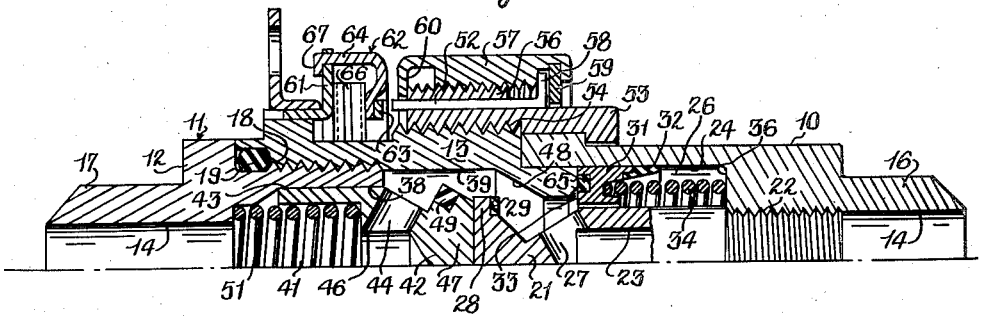
Fig. 3 is a cross-sectional view showing the arrangement of the elements during the process of disconnecting the fluid coupling incorporated in this invention.

A ratchet support 61 is mounted on the threaded sleeve 13 and provides a means for securing the ratchet assembly 62, which includes the ratchet 63, the ratchet mount 64, and the spring 66. The ratchet mount 64 is mounted on the ratchet support 61 in such a manner that it is axially slidable but rotatably fixed relative thereof. A resilient spring 66 is provided to urge the ratchet assembly 62 toward the first body member 10 as shown in Figs. 1 and 3. The ear 67 on the ratchet mount 64 limits the movement of the ratchet assembly in this direction. The ratchet 63 is formed with inclined teeth so that relative rotational motion between the pawl and the ratchet is possible in one direction, while the opposite relative rotational movement is prevented. These teeth are arranged so that when the coupling is assembled, relative rotational movement between the pawl and the ratchet is restrained and accidental uncoupling motion is prevented.

In the preferred form of this invention, the threads 54 and 56 are both standard right hand threads, so that rotation of the pawl actuating member 57 in the clockwise direction results in a coupling of the device and rotation in the counter clockwise direction results in an uncoupling of the device.

To assemble the coupling, it is necessary to bring the first body member 10 and the second body assembly 11 together in alignment with the nut 53 started on the threads of the threaded sleeve 13 until the parts assume the position shown in Fig. 1. The pawl actuating member is then rotated in the direction which will advance the pawl toward the ratchet 63. When the pawl is fully advanced, further rotational motion rotates the nut 53 causing it to be threaded further on the threaded sleeve 13 since the arms 58 on the pawls 52 prevent additional axial motion of the pawl actuating member 57 relative to the nut 53. When the elements assume the position shown in Fig. 1, the forward wall of the sliding valve member 31 engages the end wall of the threaded sleeve 13 and provides a fluid seal therebetween by means of the resilient seal 65 mounted on the sliding valve. At the same moment, the end of the stationary poppet 21 engages the end of the sliding poppet 47 so further rotation of the pawl actuating member 57 causes the nut 53 to rotate further on to the threaded sleeve 13, causing the various elements to assume the position shown in Fig. 2. The forward wall of the threaded sleeve 13 causes the sliding valve member 31 to be moved backwardly along the bore 24 thereby moving the sliding valve member away from the valve seat formed on the stationary poppet 21. At the same time, the engagement between the stationary poppet 21 and the sliding poppet 47 causes the sliding poppet to move away from its valve seat 48. Since both of the valves are then open, fluid flow is provided through the coupling.

During this latter portion of rotation of the pawl actuating member 57, the pawls 52 extend into contact with the ratchet 63 thereby compressing the spring 66. It is apparent that since the pawls 52 may not be rotated relative to the nut 53 and also since it cannot be rotated relative to the ratchet 63 in the unthreading direction, that accidental uncoupling of the coupling is prevented.

When it is desired to uncouple the coupling, the pawl actuating member 57 is rotated in the opposite direction thereby causing it to be threaded along the threads 56 on the nut 53 and moved axially backward thereon. This withdraws the pawls by means of the engagement with the arms 58 until the various elements assume the position shown in Fig. 3, at which time the pawls are completely disengaged from the ratchet. Further axial movement of the pawl actuating member 57 relative to the nut 53 beyond the position shown in Fig. 3 is prevented by the depending flange 60. Since the pawls do not engage the ratchet, further rotation of the pawl actuating member 57 causes the nut 53 to be threaded off of the threaded sleeve 13. At this time, the threaded sleeve 13 moves axially away from the first body member 10 thereby allowing the sliding valve member 31 to move axially toward the seal 29 on the stationary poppet 21, due to the spring 34. At the same time, the sliding poppet 42 moves toward its seat 48 under the force developed by the spring 51 until it seats again. Once the two valves are closed, the coupling may be completely disassembled, without permitting the loss of fluid under pressure within either of the hoses.

The clearance 37 is provided between the periphery of the stationary poppet 21 and the inner diameter of the sliding valve member 31 so that fluid may pass into and out of the area behind the sliding valve member 31. This prevents any possibility of fluid being trapped in this area and preventing proper operation of the coupling, and also insures that the fluid pressure behind the sliding valve member 31 augments the sealing force of the spring. By providing the clearance 37 between the sliding valve member 31 and the periphery of the stationary poppet 21 other advantages accrue, the first being that the device may be manufactured with much larger tolerances since the sliding valve member 31 is not supported on concentric surfaces, and the second being due to the fact that relief ports are not necessary to provide fluid communication to the area behind the sliding valve.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

A locking mechanism comprising an externally threaded part, an internally threaded nut rotatable on said part to move axially relative thereto to couple said parts when said nut is rotated in one direction relative to the part, pawl means mounted on said nut for rotation therewith said pawl means being axially movable relative to said nut, said nut being externally threaded with threads of the same hand as those of the internal threads of the nut, an internally threaded sleeve screwed on to the external threads of said nut, stop means limiting the axial motion of said sleeve on said nut in both directions while providing a range of relative axial motion of said sleeve and nut in response to relative rotation of said latter members, ratchet means on said externally threaded part, means resiliently mounting said ratchet means on said part to urge said ratchet means axially outwardly toward said pawl means, means to limit the axially outward motion of said ratchet means, means on said sleeve rotatably receiving a portion of said pawl means for fully projecting said pawl means axially toward said ratchet means when said sleeve is turned in said one direction with respect to said nut as far as said stop means will permit and to retract axially the pawl when said sleeve is turned in the opposite direction, said pawl means being spaced from said ratchet means upon initial screw coupling of said nut and said externally threaded part, continued coupling rotation of said sleeve and nut in said one direction with said sleeve turned as far in said one direction as said stop means will permit closing said space between said pawl and ratchet means to bring said pawl means against said ratchet means, further rotation of said sleeve and nut in said one direction causing axially inward motion of said resiliently mounted ratchet means and simultaneous ratcheting of said pawl means about said ratchet means until said internally threaded part and said nut are fully coupled.

References Cited in the file of this patent

UNITED STATES PATENTS

| | | |
|---|---|---|
| Re. 23,586 | Merriman | Nov. 18, 1952 |
| 757,457 | Hancock | Apr. 19, 1904 |
| 884,933 | Kesler | Apr. 14, 1908 |
| 1,007,706 | Kehoe | Nov. 17, 1911 |
| 1,033,585 | Hickey et al. | July 23, 1912 |
| 1,559,874 | Holland | Nov. 3, 1925 |
| 1,580,694 | Smith | Apr. 13, 1926 |
| 1,857,420 | Wolford | May 10, 1932 |
| 1,885,321 | Benn | Nov. 1, 1932 |
| 2,391,022 | Main | Dec. 18, 1945 |
| 2,436,206 | Deming | Feb. 17, 1948 |
| 2,441,363 | Krueger | May 11, 1948 |
| 2,505,093 | Brock | Apr. 25, 1950 |
| 2,643,140 | Scheiwer | June 23, 1953 |
| 2,709,093 | Zeeb | May 24, 1955 |
| 2,731,058 | Smisko | Jan. 17, 1956 |